(12) United States Patent
Abhishek et al.

(10) Patent No.: US 7,809,844 B2
(45) Date of Patent: Oct. 5, 2010

(54) INTERNATIONAL REGULATORY COMPLIANCE FOR AD HOC NETWORKING

(75) Inventors: Abhishek Abhishek, Woodinville, WA (US); Amer A. Hassan, Kirkland, WA (US); Yi Lu, Bellevue, WA (US); Vishesh M. Parikh, Redmond, WA (US); Thomas Kuehnel, Seattle, WA (US); Hui Shen, Issaquah, WA (US); Jiandong Ruan, Sammamish, WA (US); Taroon Mandhana, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 11/204,558

(22) Filed: Aug. 15, 2005

(65) Prior Publication Data

US 2007/0038776 A1    Feb. 15, 2007

(51) Int. Cl.
  G06F 15/16    (2006.01)
  H04H 20/71   (2008.01)
  H04B 7/00    (2006.01)
(52) U.S. Cl. .............. 709/228; 709/227; 455/3.01; 455/41.2
(58) Field of Classification Search ............. 709/220, 709/227, 228, 245; 455/3.01, 41.2
  See application file for complete search history.

(56) References Cited

U.S. PATENT DOCUMENTS

| | | | |
|---|---|---|---|
| 5,729,680 A * | 3/1998 | Belanger et al. | 709/222 |
| 5,881,236 A * | 3/1999 | Dickey | 709/221 |
| 6,021,496 A * | 2/2000 | Dutcher et al. | 726/21 |
| 2004/0127240 A1 * | 7/2004 | Li | 455/500 |
| 2004/0198220 A1 * | 10/2004 | Whelan et al. | 455/41.1 |
| 2004/0203762 A1 * | 10/2004 | Liu et al. | 455/434 |
| 2005/0037754 A1 * | 2/2005 | Liu et al. | 455/435.3 |
| 2005/0147070 A1 * | 7/2005 | Cromer et al. | 370/338 |
| 2006/0009219 A1 * | 1/2006 | Jaakkola et al. | 455/435.2 |

OTHER PUBLICATIONS

International Search Report from corresponding International Application No. PCT/US2006/032010.
IEEE Standard for information technology—telecommunications and information exchange between systems—local and metropolitan area networks—specific requirement. Part 11: wireless LAN medium access control (MAC) and physical layer (PHY) specification. Amendment 3: specifications for operation in additional regulatory domains', IEEE Std 802.11d, Jul. 13, 2001.
IEEE Std 802.11d-2001, Jul. 2001, IEEE, New York.

\* cited by examiner

*Primary Examiner*—Larry Donaghue
*Assistant Examiner*—Brian J Gillis
(74) *Attorney, Agent, or Firm*—Wolf, Greenfield & Sacks, P.C.

(57) ABSTRACT

A method is provided to facilitate compliance with wireless communication regulations for a regulatory domain when creating or joining an ad hoc network. The method can include interacting with a driver of a wireless communication device to facilitate compliance. Another method is provided to offer an option to enable or disable prompting to verify a regulatory domain to use to create or join an ad hoc network. Another method is provided for facilitating compliance with wireless communication regulations for a plurality of regulatory domains. The method includes using a common channel as a communication channel for a wireless communication device when joining or creating an ad hoc network, wherein the common channel is common to the plurality of regulatory domains.

12 Claims, 8 Drawing Sheets

INTERNATIONAL REGULATORY COMPLIANCE FOR AD HOC NETWORKING

BACKGROUND

Wireless communication devices (e.g., wireless network interface cards) operating on an unlicensed spectrum should comply with wireless communication regulations, which can vary from one regulatory domain (e.g., country or district) to another. Wireless communication regulations may include allowed channel allocations (i.e., signal frequencies and bandwidth) and corresponding allowed power levels The IEEE 802.11d standard allows hardware manufacturers to build wireless communication devices that may operate in multiple regulatory domains and enable the use of wireless networks legally across the globe without the purchase of additional equipment. The 802.11d standard is similar to other 802.11 standards, except that the configuration of the device can be fine-tuned at the Media Access Control (MAC) layer to ensure compliance with the regulatory domain in which the wireless communication device is operating. Therefore, the 802.11d standard may be utilized to enable global roaming using a single wireless communication device.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

SUMMARY OF THE INVENTION

Upon joining and/or creating an ad hoc network, a country code associated with a regulatory domain may be provided so as to ensure international regulatory compliance. Conventional systems however may not facilitate such regulatory compliance for ad hoc networks.

Applicants have identified and appreciated that an interaction with a driver of a wireless communication device can facilitate compliance with wireless communication regulations for a regulatory domain when creating or joining an ad hoc network. The interaction may be between an operating system and the driver, and information received from the driver may include a list of regulatory domains supported by the driver. Furthermore, upon starting the driver, the list of supported regulatory domains may be provided by the driver, thereby ensuring that a current list of supported regulatory domains is readily available. Another interaction with the driver may include determining whether an ad hoc network to be joined broadcasts on a communication channel allowed by a selected regulatory domain.

To ensure regulatory compliance, a user may select the regulatory domain where he resides. A current list of supported regulatory domains may be presented to a user when creating or joining an ad hoc network. Upon presenting the list, the user can select the regulatory domain he believes he resides in, and then the ad hoc network may be created or joined.

Applicants have further appreciated that a previously supplied regulatory domain may be used to create or join an ad hoc network, and a user can be prompted to verify and/or change the previously supplied regulatory domain. Furthermore, to improve usability, a user may be provided with an option to disable the prompting to verify the selected regulatory domain.

Applicants have also appreciated that locale information may be used to facilitate compliance with wireless communication regulations for a regulatory domain when creating or joining an ad hoc network. Retrieved locale information may be used to deduce a regulatory domain (and corresponding country code) to use when creating or joining ad hoc networks. A mapping between locale information and regulatory domains may be provided to determine the regulatory domain based on the locale information.

Applicants have further appreciated that a communication channel common to all regulatory domains may be used to create or join an ad hoc network, thereby facilitating compliance with wireless communication regulations. Furthermore, a lowest power level common to all regulatory domains can be used to also ensure compliance. Also, upon a detection of one or more other networks broadcasting the same country code, using channels consistent with one regulatory domain, and/or using the same channel, an ad hoc network can be created or joined using the deduced regulatory domain and/or channel.

DETAILED DESCRIPTION

The 802.11d standard provides a framework to enable international regulatory compliance, but the mechanisms used to ensure regulatory compliance may vary depending on whether the wireless network is an infrastructure network or an ad hoc network.

In the case of an infrastructure network, the network includes an access point which is a station that transmits and receives data. An access point can connect users within the network to each other and can also serve as a point of interconnection between the wireless network and a fixed wire network. When joining an infrastructure wireless network, an operating system on an infrastructure client may not perceive any client configurations issues resulting from the 802.11d standard, since a MAC layer in a driver of a wireless communication device may handle 802.11d issues entirely.

For example, the MAC layer of an infrastructure client may determine the country code of the regulatory domain from an 802.11d compliant access point broadcasting the country code in a beacon. Alternatively, the infrastructure client may infer the country code and/or allowed channels by determining which channels the access point beacons are transmitted on.

In contrast, in the case of an ad hoc network, an operating system on an ad hoc client may supply a country code to the driver of the wireless communication device so as to ensure that the ad hoc network complies with the wireless communication regulations of the regulatory domain. For example, when creating a new ad hoc network, the 802.11d standard dictates that a country code be provided to the MAC layer in the driver of the wireless communication device before the MAC layer can direct the creation of the ad hoc network.

Figure 1:
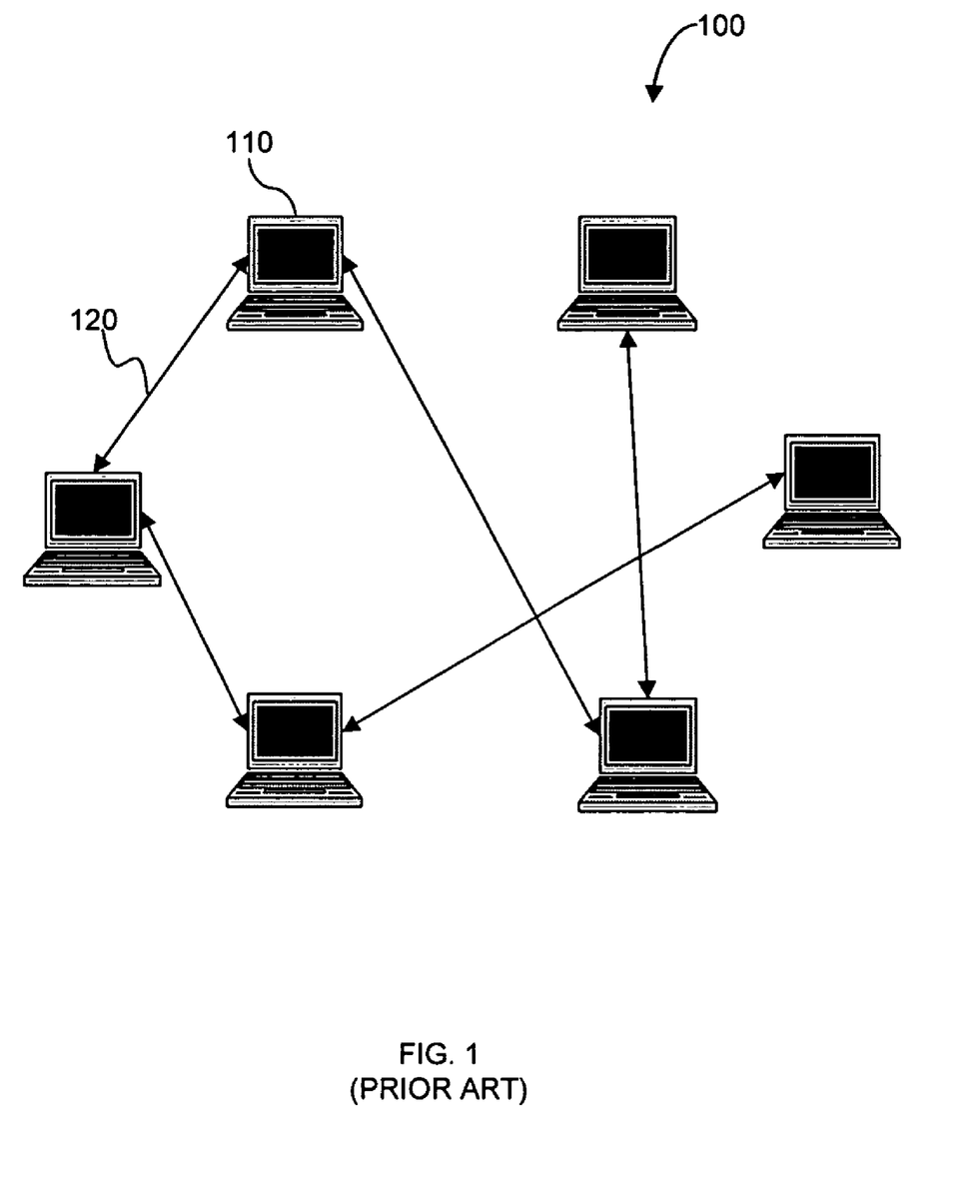
FIG. 1 is a prior art ad hoc network.

FIG. 1 illustrates an ad hoc network 100 comprising mobile nodes 110. These mobile nodes 110 may be routers and/or hosts, and may be any apparatus comprising a wireless communication device (e.g., including a transmitter and receiver). The mobile nodes may be laptop computers, tablet computers, digital assistants, mobile phones, and/or any other apparatus comprising a wireless communication device, as the invention is not limited in this respect. The mobile nodes 110 may communicate 120 directly with each other (i.e., without the aid of access points), and therefore have no fixed infrastructure. The ad hoc network 100 may form an arbitrary topology, where the mobile nodes 110 can be free to move and arrange themselves as desired. Furthermore, the mobile nodes 110 can act as routers, therefore a packet can travel directly from a source node to a destination node, or via one or more intermediate nodes that forward the packet.

Ad hoc networks allow for the establishment of a network without the use of an access point, therefore allowing users greater flexibility in establishing communication between multiple mobile nodes. When joining and/or creating an ad hoc network, a country code associated with a regulatory domain may be provided so as to ensure international regulatory compliance. Applicants have appreciated that current systems may not facilitate international regulatory compliance for ad hoc networks.

In accordance with various embodiments, methods and apparatus are provided for facilitating compliance with wireless communication regulations for a regulatory domain when creating or joining an ad hoc network.

Figure 2:
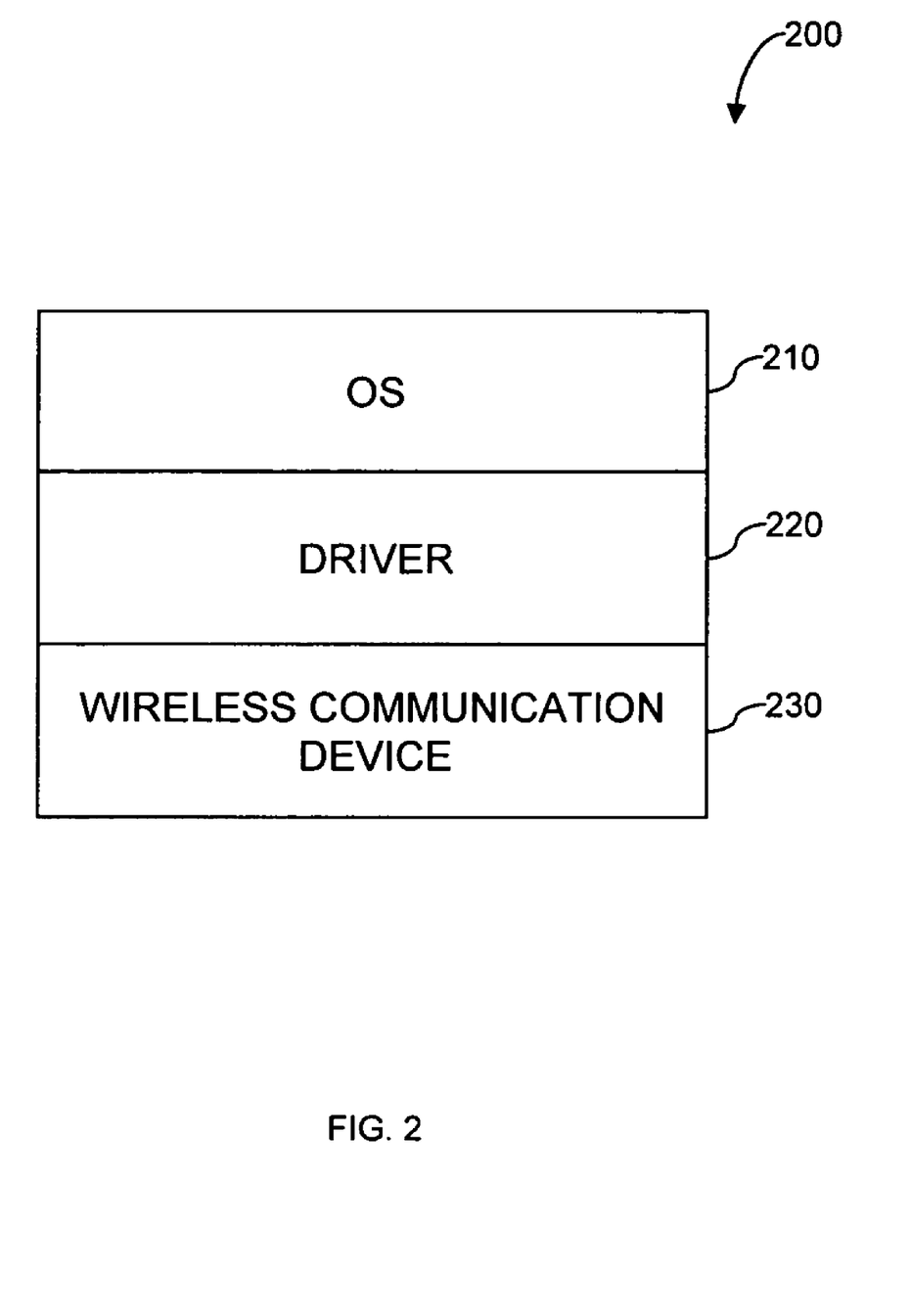
FIG. 2 is a schematic of a mobile node comprising a wireless communication device, a driver, and an operating system.

FIG. 2 illustrates a schematic of an example of a mobile node 200 comprising a wireless communication device 230, a driver 220 for the wireless communication device 230, and an operating system 210. The mobile node 200 may be any type of system comprising a wireless communication device 230, for example, a laptop computer, a tablet computer, a digital assistant, a mobile phone, etc.

The wireless communication device 230 may be a network interface card, or any other device that enables wireless communication between the mobile node 200 and any other node in a network. The driver 220 for the wireless communication device 230 may include a MAC layer (which is part of the data link layer referred to as layer 2 in the Open System Interconnection (OSI) model), a physical layer (PHY) (referred to as layer 1 in the OSI model), and/or any other layers, as the invention is not limited in this respect. The operating system 210 may be a program executing on the mobile node that manages application programs executing on the mobile node, can handle input to and output from attached hardware devices, and/or performs other management operations. The device driver 220 can convert general input/output instructions of the operating system 210 to instructions that the wireless communication device 230 can process. Furthermore, the device driver 220 may also control some of the operation of the wireless communication device 230 without the need for instructions from the operating system 210. It should be noted that the mobile node 200, illustrated in FIG. 2, is just one example of a mobile node, and the invention is not limited to just this example.

Figure 3:
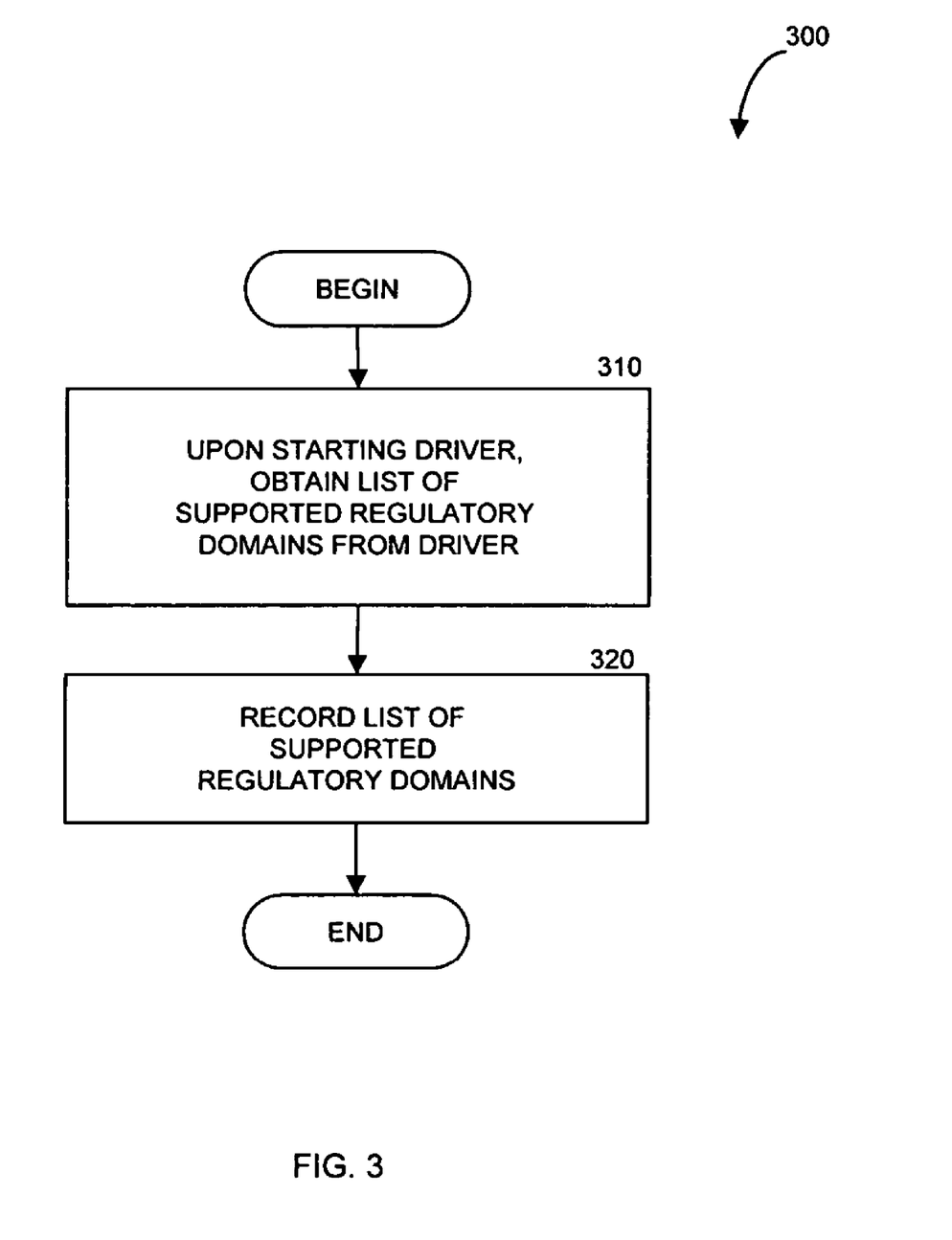
FIG. 3 is a flowchart of a method of interacting with a driver of a wireless communication device to facilitate compliance with wireless communication regulations in accordance with one embodiment of the invention.

In some embodiments of the invention, a method is provided whereby interaction with a driver of a wireless communication device facilitates compliance with wireless communication regulations for a regulatory domain when creating or joining an ad hoc network. In some embodiments, an operating system interacts with the driver of a wireless communication device to facilitate compliance with wireless communication regulations for a regulatory domain when creating or joining an ad hoc network FIG. 3 illustrates a flowchart for a method 300 of interacting with a driver for a wireless communication device to facilitate compliance with wireless communication regulations for a regulatory domain. The method 300 may be performed, entirely or partially, by an operating system of a mobile node comprising the driver of a wireless communication device, but may be performed, entirely or partially, by any other entity (e.g., other software and/or hardware), as the invention is not limited in this respect.

In step 310, upon the start of the driver, a list of regulatory domains supported by the driver (and the associated wireless communication device) are obtained from the driver. The driver may support the regulatory domains by including a mapping between regulatory domains and the allowed channels and power levels for each regulatory domain. The driver can use this mapping to select a channel and power level, to utilize to create or join an ad hoc network, based on a selected regulatory domain.

The driver may supply the list of supported regulatory domains upon receiving a request for supported regulatory domains, may supply the list upon every start, and/or may supply the list as a result of any other request, signal, or instruction, as the invention is not limited in this respect. For example, the operating system may obtain the list of regulatory domains upon starting the driver of the wireless communication device.

In step 320, the list of supported regulatory domains is recorded. Once recorded, the list of supported regulatory domains may be accessed without further obtaining the supported regulatory domains from the driver. For example, the operating system may store the list of supported regulatory domains in memory, in a file, and/or by any other means, as the invention is not limited in this respect. During future processing, the operating system may retrieve the stored list of supported regulatory domains and may use this information in accordance with other embodiments of the invention, and/or for any other reason.

In some embodiments of the invention, a method is provided for facilitating compliance with wireless communication regulations for a regulatory domain when creating an ad hoc network. In some embodiments of the invention, a method is provided for providing an option to enable or disable prompting of a verification of a selected regulatory domain to use prior to creating an ad hoc network.

Figure 4:
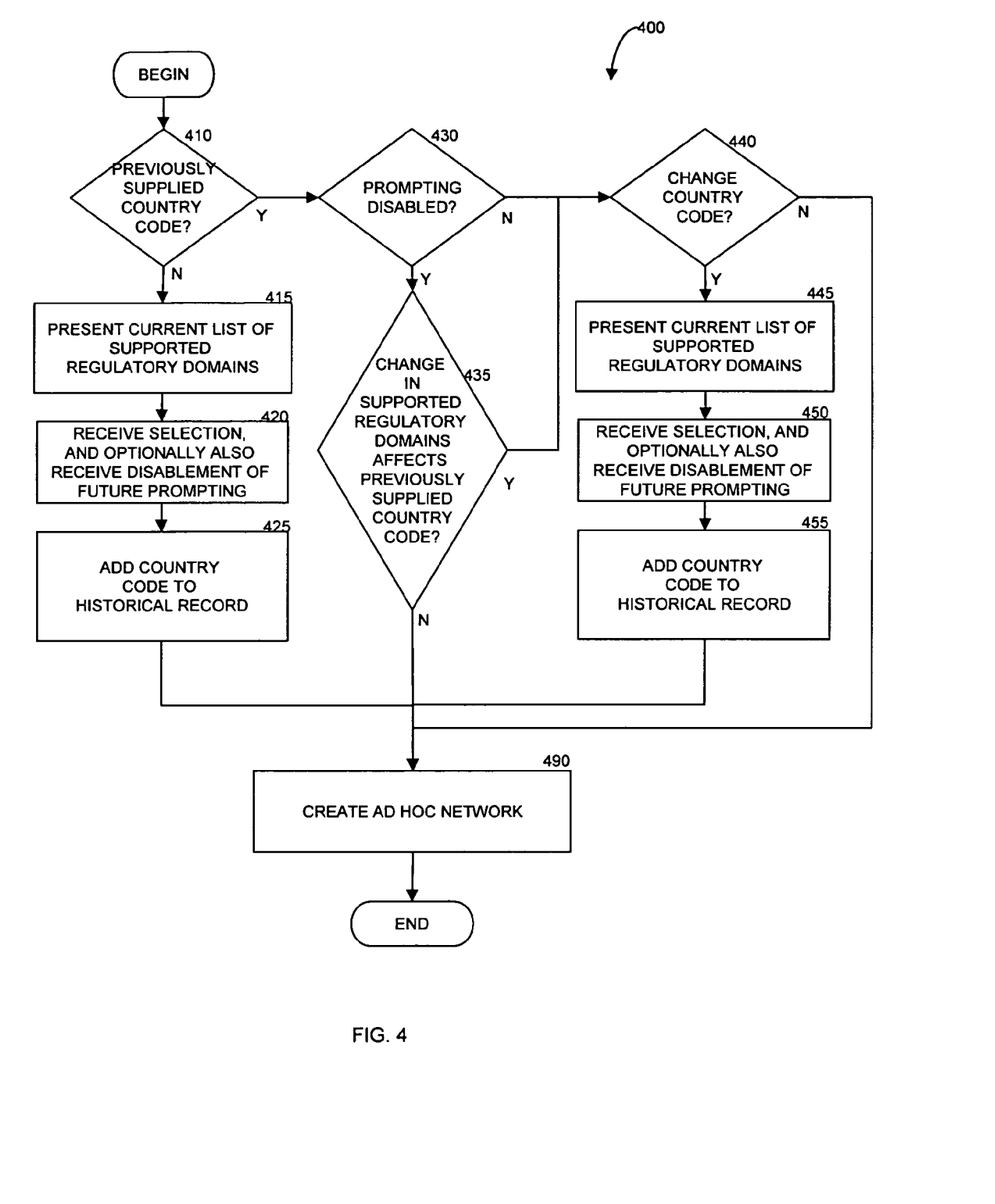
FIG. 4 is a flowchart of a method of facilitating compliance with wireless communication regulations for a regulatory domain when creating an ad hoc network in accordance with one embodiment of the invention.

FIG. 4 illustrates a flowchart of a method 400 for facilitating compliance with wireless communication regulations for a regulatory domain when creating an ad hoc network. The method 400 may allow for prompting (e.g., presented to a user) to provide verification of a selected regulatory domain prior to creating an ad hoc network. Method 400 can also support an option to allow for the enablement or disablement of the prompting of the verification of the selected regulatory domain.

Method 400 can be performed, either entirely or partially, by an operating system of a mobile node, and/or by one or more other entities, as the invention is not limited in this respect.

Upon an indication (e.g., provided by a user) to create an ad hoc network, method 400 may begin with step 410, where a determination is made as to whether a previously supplied country code is available. A country code refers to a code utilized to denote a regulatory domain (e.g., a country, district, etc.) that may have different wireless communication regulations. A previously supplied country code may have been previously stored, for example, during a previous process of creating or joining a network, during a setup process directed by a user, or during any other process, as the invention is not limited in this respect. Furthermore, an historical record of previously supplied country codes may be maintained to keep track of country codes that have been supplied. The historical record can include all country codes previously supplied or only some of the country codes previously supplied. For example, the historical record may include the most recent (e.g., the last N, where N is a positive integer) previously supplied country codes. Configuration settings may allow for a specification of the maximum number of previously supplied country codes that may be stored. For example, a configuration setting may indicate that only the last country code is stored in the historical record, corresponding to a case where N equals one.

If a determination is made that no previously supplied country code is available, then the method 400 proceeds to step 415, where a current list of supported regulatory domains may be presented. The current list of supported regulatory domains may be retrieved from a record created using method 300, illustrated in FIG. 3, or by any other method. For example, in another approach, the current list of supported regulatory domains may be retrieved directly from a driver of a wireless communication device and then presented. The current list of the supported regulatory domains may be presented in a graphical format, for example a graphical user interface, that displays the supported regulatory domains. The current list of the supported regulatory domains may be presented in any other format, including an auditory format, as the invention is not limited in this respect.

A user may then select the regulatory domain which be believes he is located in, and as a result, the entity performing the method 400 (e.g., the operating system) may proceed to receive the selection (step 420). Optionally, a user may also provide an indication to disable any future prompting to verify whether to use a previously supplied country code to create or join an ad hoc network, which may also be received by the entity performing the method 400 (e.g., the operating system) (step 420).

Upon receiving the selected regulatory domain, the country code for that domain may be added to an historical record that may also include other previously supplied country codes (step 425). Step 425 may be performed by the operating system which may maintain the historical record of the previously supplied country codes as a file or via any other storage mechanism.

The method then continues with step 490, where an ad hoc network is created using the country code received in the previous steps. Step 490 may include the operating system sending an instruction to a driver of a wireless communication device to create an ad hoc network. The instruction may include the country code to use (as determined by steps 410-455) to create the network, and may allow the driver to create an ad hoc network compliant with international wireless regulations. The driver may access an internal mapping that specifies the allowed channels and power levels for the specified country code. Once this is determined, the driver may proceed to direct the operation of the wireless communication device based on these allowed channels and power levels.

Returning to the discussion of step 410, if it is determined that a country code was previously supplied, then that previously supplied country code may be used to establish an ad hoc network. The previously supplied country code may be the most recent country code stored in the historical record of supplied country codes, or may be retrieved from any other storage location, for example, from a memory location that stores the country code used to create or join the most recent network.

Then in step 430, a determination is made as to whether prompting has been disabled. Prompting may include verifying whether to use the previously supplied country code to create the ad hoc network, and may include an option to change the country code. In providing an option to disable prompting, a user may avoid having to respond to a country code verification prompt prior to creating (or joining) an ad hoc network. In doing so, the user experience may be less cumbersome, and more user-friendly, but, when prompting is disabled, the onus may be on the user to ensure that the correct country code is used.

If prompting is disabled, the method proceeds with step 435, where a determination is made as to whether there has been a change in the supported regulatory domains (since the last creation or joining of an ad hoc network) that may impact the previously supplied country code that will be used the create the ad hoc network. For example, the driver of the wireless communication device may have been updated since last creating or joining a network, and as such, the regulatory domains supported by the driver may have been modified. Therefore, if the previously supplied country code is no longer supported by the current driver, the previously supplied country code cannot be used to create or join an ad hoc network.

If it is determined, in step 435, that there is no change to the supported regulatory domains that can affect the previously supplied country code, the method proceeds to create the ad hoc network in step 490 (as described previously).

If it is determined that there is a change to the supported regulatory domains that may affect the previously supplied country code (step 435) or if prompting is not disabled (step 430) (i.e., prompting is enabled), the method proceeds to prompt the user for verification of the country code. During the prompting process, the user may be presented with an opportunity to change the country code (i.e., the regulatory domain) or verify that the previously supplied country code should be used to create the ad hoc network. The prompting process may involve the use of one or more user interfaces (e.g., graphical user interfaces) that enable the user to respond to the prompting process.

In step 440, a determination is made as to whether the country code to use to establish the ad hoc network should be changed. If a user indicates that the country code should be changed (and hence to not use the previously selected country code to create the ad hoc network), the method proceeds with step 445, 450 and 455. In step 445, the current list of supported regulatory domains may be presented, as was previously described for step 415.

A user may then select the regulatory domain which be believes he is located in, and as a result, the entity performing the method 400 (e.g., the operating system) may proceed to receive the selection (step 450), as also described for step 420. Optionally, a user may also provide an indication to disable any future prompting to verify whether to use a previously supplied country code to create or join an ad hoc network, which may also be received by the entity performing the method 400 (e.g., the operating system) (step 450).

Upon receiving the selected regulatory domain, the country code for that domain may be added to the historical record including one or more previously supplied country codes (step 455), as described in connection with step 425. The method may then continue with step 490, where an ad hoc network is created for the country code received in the previous steps.

Returning to the discussion of step 440, if a determination is made that the previously supplied country code should not be changed, and therefore should be used to create the ad hoc network, the process may then proceed to step 490, where an ad hoc network is created using the previously supplied country code.

Method 400 may facilitate compliance with wireless communication regulations when creating an ad hoc network via an interaction between an operating system (that may be performing method 400) and the driver of the wireless communication device. Furthermore, method 400 may also facilitate compliance with wireless communication regulations when creating an ad hoc network by providing interaction (e.g., prompting) between the operating system (that may be performing method 400) and the user.

In some embodiments of the invention, a method is provided for facilitating compliance with wireless communication regulations for a regulatory domain when joining an ad hoc network. In some embodiments of the invention, a method is provided for providing an option to enable or disable prompting of a verification of a selected regulatory domain to use prior to joining an ad hoc network.

Figure 5:
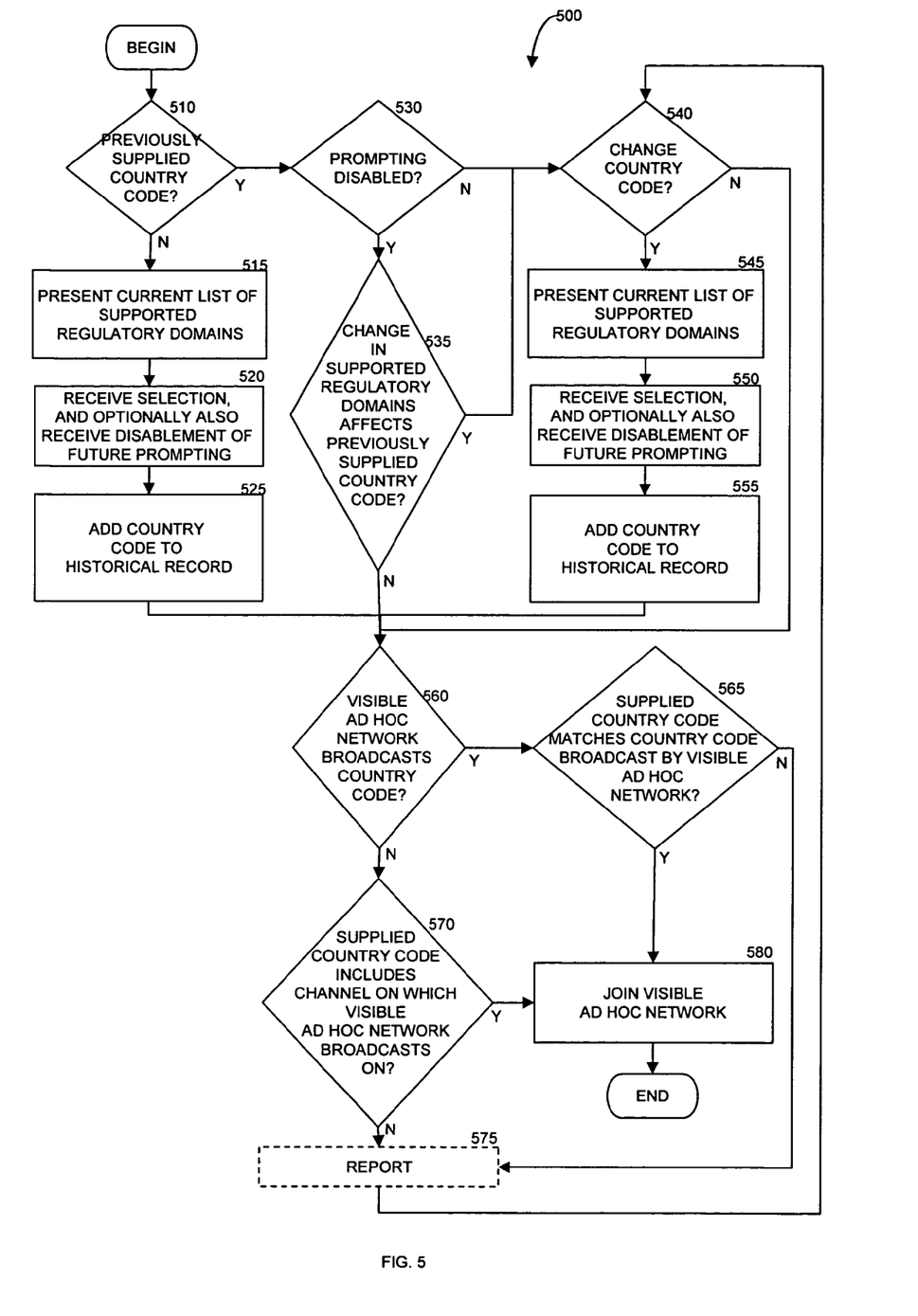
FIG. 5 is a flowchart of a method of facilitating compliance with wireless communication regulations for a regulatory domain when joining a visible ad hoc network in accordance with one embodiment of the invention.

FIG. 5 illustrates a flowchart of a method 500 for facilitating compliance with wireless communication regulations for a regulatory domain when joining a visible ad hoc network. Method 500 may allow for a prompting (e.g., presented to a user) to provide verification of a selected regulatory domain prior to joining an ad hoc network. Method 500 can also support an option to allow for the enablement or disablement of the prompting of the verification of the selected regulatory domain.

Method 500 can be performed, either entirely or partially, by an operating system of a mobile node, and/or by one or more other entities, as the invention is not limited in this respect.

Method 500 includes steps 510, 515, 520, 525, 530, 535, 540, 545, 550, and 555 (referred to as steps 510-555) which are the same as steps 410, 415, 420, 425, 430, 435, 440, 445, 450, and 455, respectively, of method 400. The difference between method 400 and 500 being that upon determination of which country code should be used, method 400 proceeds to create an ad hoc network using that country code (step 490), whereas method 500 proceeds to attempt to join a visible ad hoc network using the country code (steps 560, 565, 570, 575, and 580).

Upon performing at least some of the steps 510-555, the method proceeds to step 560, where a determination is made as to whether the visible ad hoc network broadcasts a country code. For example, networks may broadcast beacon signals, that may include country code information. The operating system (that may be performing method 500) may retrieve the country code information broadcast by the visible network via interaction with the driver of the wireless communication device. For example, the driver may voluntarily supply the country code broadcast by any visible network, or may supply this information upon receiving a query from the operating system. If it is determined that the visible ad hoc network does broadcast a country code, the method may proceed to step 565.

In step 565, a determination is made as to whether the country code supplied from steps 510-555 matches the country code broadcast by the visible ad hoc network. If there is a match between the country codes, then the method can proceed to join the visible ad hoc network using the country code supplied from steps 510-555 (step 580).

Step 580 may include the operating system sending an instruction to the driver of the wireless communication device to join the ad hoc network. The instruction may include the country code to use (as supplied by steps 510-555), and may allow the driver to create an ad hoc network compliant with international wireless regulations. Given the country code, the driver may access an internal mapping that specifies the allowed channels and power levels for the specified country code. Once this is determined, the driver may proceed to direct the operation of the wireless communication device based on these allowed channels and power levels. Once the network has been joined, method 500 may terminate.

Returning to the discussion of step 565, when it is determined that the country code supplied from steps 510-555 does not match the country code broadcast by the visible ad hoc network, the method may proceed to optional step 575, where a report of the mismatch in country codes may be presented, for example, using a dialog box presented to a user (step 575). The method then proceeds to step 540, where a user may be prompted to change the country code, and the method proceeds as previously described. Upon determining a new country code to use in attempting to join the visible ad hoc network (steps 540, 545, 550, and 555), the method once again proceeds to step 560, and continues as described above.

Returning to the discussion of step 560, when it is determined that the visible ad hoc network does not broadcast a country code, the method proceeds to step 570. In step 570, a determination may be made as to whether the channel on which the visible ad hoc network broadcasts is allowed by the regulations associated with the country code supplied in steps 510-555. To reach such a determination, the operating system (that may be performing method 500) may provide the country code supplied in steps 510-555 to the driver of the wireless communication device. The driver may then determine (e.g., using an internal mapping between country codes and allowed channels and power levels) which channels are allowed for the regulatory domain corresponding to the supplied country code. A determination can then be made as to whether any of the channels allowed for the supplied country code match the channel of the visible ad hoc network, and this conclusion may be returned to the operating system. If there is match, the method proceeds to step 580, where the visible ad hoc network is joined using the same channel used by the visible ad hoc network, and optionally, using the lowest possible power level, so as to ensure regulatory compliance.

If it is determined that the none of channels allowed for the supplied country code match the channel of the visible ad hoc network, the method proceeds to step 575, and an optional report may be presented, as previously described. Then the method continues with step 540 where the user is prompted to change the supplied country code, as described above.

Method 500 may facilitate compliance with wireless communication regulations when joining a visible ad hoc network via the use of an interaction between an operating system (that may be performing method 500) and the driver of the wireless communication device. Furthermore, method 500 may also facilitate compliance with wireless communication regulations when joining a visible ad hoc network by providing interaction (e.g., prompting) between the operating system (that may be performing method 400) and the user.

In some embodiments of the invention, a user interface is provided that comprises an option to enable or disable prompting of a verification of a selected regulatory domain to use prior to creating or joining an ad hoc network.

Figure 6:
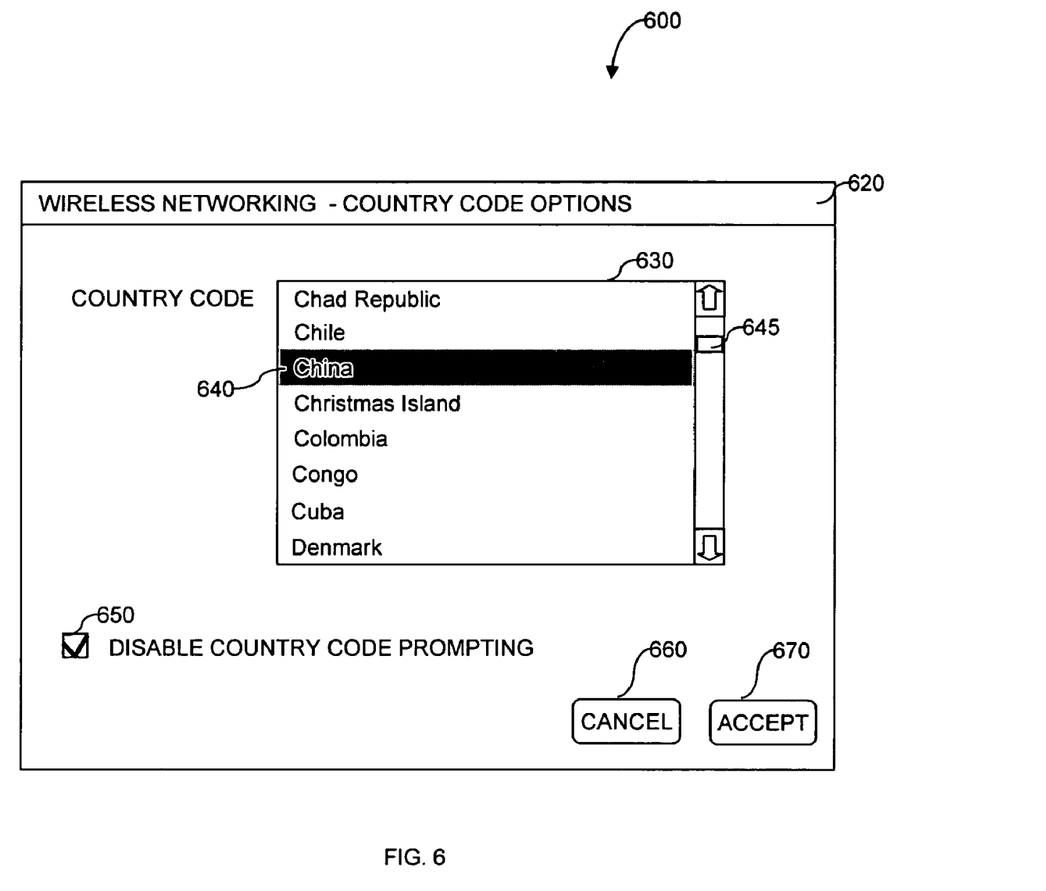
FIG. 6 is a graphical user interface that enables a selection of a country code to use when joining or creating a network, and/or to disable country code prompting in accordance with one embodiment of the invention.

FIG. 6 illustrates a graphical user interface 600 that enables a selection of a country code to use to join or create a network, and/or to disable country code prompting (which was described in connection with method 400 and 500).

The graphical user interface 600 may include a title bar 620 that may indicate that the user interface provides country code options for wireless networking. The graphical user interface 600 may also include a means to select a specific supported country code (e.g., 640) from a list of supported country codes 630. To enable scrolling, up and down the list, a scroll bar 645 may be present along a side of the list of country codes.

The graphical user interface 600 may also include a checkbox 650 that, when checked, disables country code prompting prior to joining or creating a network. Alternatively, a checkbox may be used to specify that country code prompting should be enabled, as the invention is not limited in this respect. Lastly, a cancel button 660 and an accept button 670, may allow a user to cancel or accept the current selections.

The graphical user interface 600 is one example of one user interface that enables a selection of a country code to use to join or create a network, and/or allows for disabling/enabling of country code prompting. It should be appreciated that other graphical user interfaces may be used to accomplish similar functions.

In some embodiments of the invention, locale information may be used to facilitate compliance with wireless communication regulations for a regulatory domain when creating or joining an ad hoc network.

Figure 7:
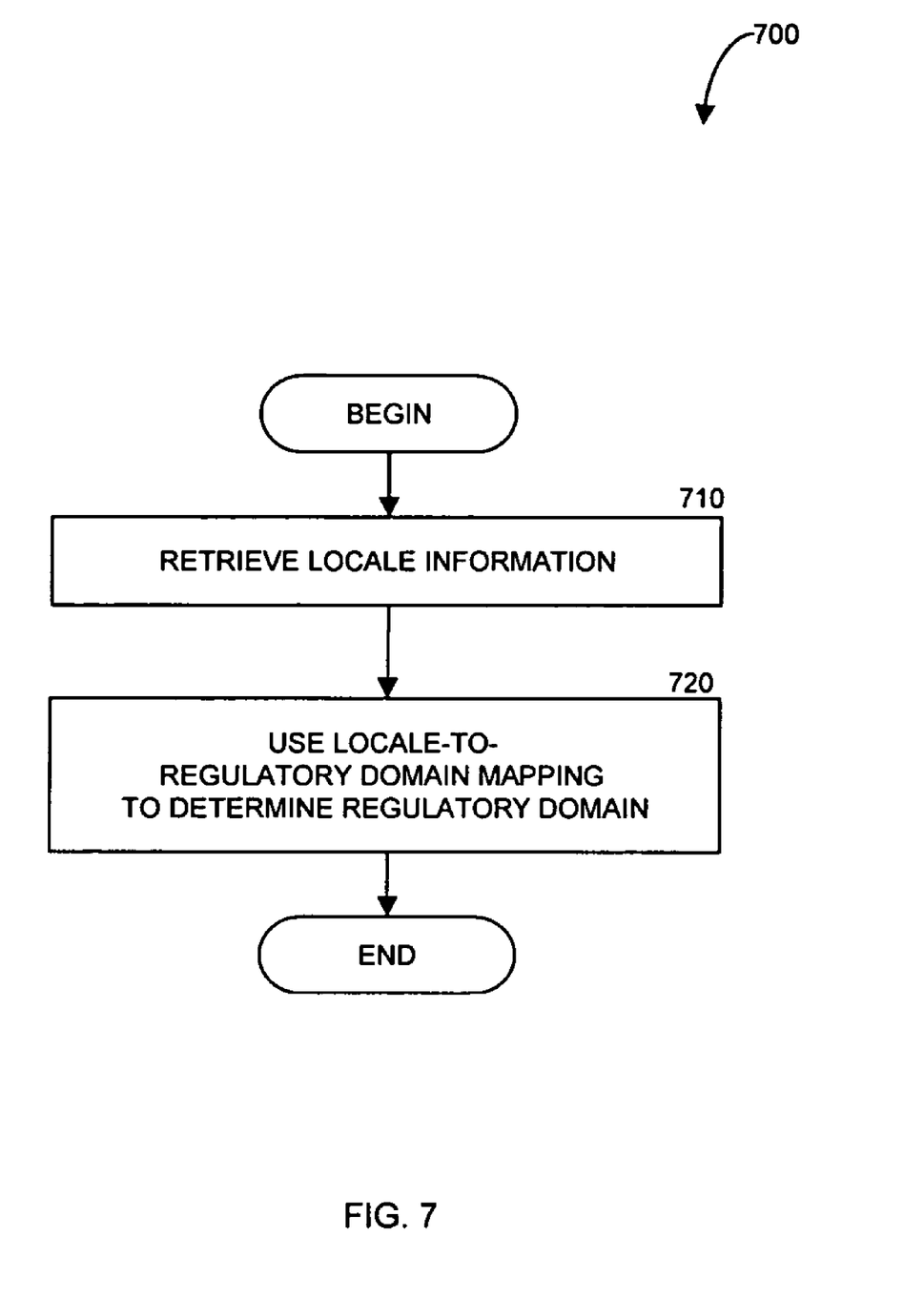
FIG. 7 is a flowchart of a method of using locale information to facilitate compliance with wireless communication regulations in accordance with one embodiment of the invention.

FIG. 7 illustrates a flowchart of a method 700 for using locale information to facilitate compliance with wireless communication regulations. Locale information is stored and used by some operating systems to specify information associated with a geographic locale. Locale information may include parameters defining country/region code (e.g., as specified by international phone codes), calendar type, local currency symbols, date format, language, and other locale-specific information, as the invention is not limited in this respect. Method 700 may be performed, partially or entirely, by an operating system, or by one or more other entities, as the invention is not limited in this respect either.

In step 710, locale information for the specific mobile node on which method 700 is being performed is retrieved. Some or all of the locale information may be retrieved so as to allow for a deduction of the country code to use when creating or joining an ad hoc network. For example, when the locale information includes a locale country/region code, this information may be retrieved and used in subsequent steps.

In step 720, the retrieved locale information may be used to deduce the corresponding country code (i.e., regulatory domain) to use when creating or joining ad hoc networks. A mapping between locale information and regulatory domains may be provided which can be used in step 720 to determine the regulatory domain based on the locale information.

For example, if the locale information includes a locale country/region code, this information may be used to make a deduction about the regulatory domain. It should be appreciated that, in some instances, there may not be a one-to-one mapping between locale information and regulatory domains, and as such further information may be required to determine the regulatory domain. For example, a locale country/region code may contain more than one regulatory domain, which a user may then be presented and provided the opportunity to select a regulatory domain from this restricted group of possible regulatory domains. In contrast, in cases when the locale country/region code specifies only one possible country code, further information may not be sought.

One drawback of this approach may be that locale information is not always modified when roaming from one geographic locale to another, hence the regulatory domain may not always be properly selected based on the method. To solve this problem, a user may have a responsibility to change one or more locale parameters when roaming between geographic regions.

In some embodiments of the invention, a communication channel common to a plurality of regulatory domains may be used to create or join an ad hoc network, so as to facilitate compliance with wireless communication regulations.

In some embodiments of the invention, a detection of one or more other networks using channels consistent with the same country code, and/or using the same channel, can be used to facilitate compliance of an ad hoc network with wireless communication regulations.

Figure 8:
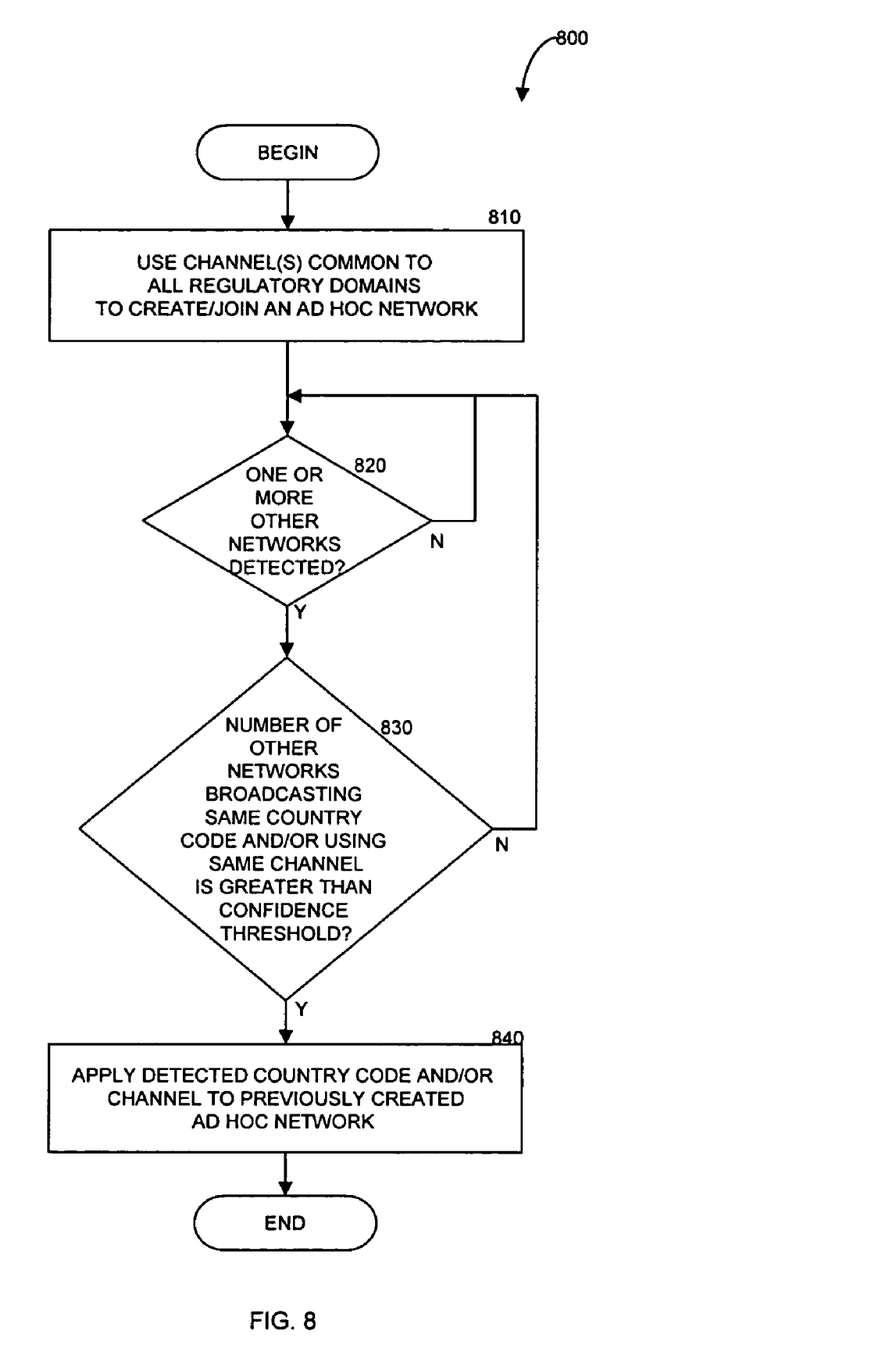
FIG. 8 is a flowchart of a method of facilitating compliance with wireless communication regulations when creating or joining ad hoc networks in accordance with one embodiment of the invention.

FIG. 8 illustrates a method 800 for facilitating compliance with wireless communication regulations when creating and/or joining ad hoc networks. Method 800 may be performed, partially or entirely, by an operating system, and/or by one or more other entities, as the invention is not limited in this respect.

In this method, one or more channels common to all supported regulatory domains are used to create or join an ad hoc network (step 810). Furthermore, the power level utilized may be the lowest power level allowed across all the supported regulatory domains. In doing so, regulatory compliance can be ensured irrespective of the regulatory domain in which the network is located.

The method 800 may also include a step 820, where a determination is made as to whether one or more other networks visible to the mobile node (on which method 800 can be performed) are detected. If no other networks are detected, the method continues to listen for other networks.

If one or more other networks are detected, the method proceeds to step 830, where a determination is made as to whether the number of detected networks broadcasting the same country code and/or broadcasting on the same channel is greater than a confidence threshold number (e.g., one, two, three, four, etc.). This confidence threshold test attempts to ensure that a significant number of detected networks are all operating using the same country code or channel, thereby potentially minimizing the chance of using the same country code utilized by one or a few rogue networks (using non-compliant channels). If the confidence test is not passed, the method 800 returns step 820.

Upon passing the confidence test in step 830, the method 800 proceeds to step 840, where the detected country code and/or channel is used to modify the previously created ad hoc network, and/or to create or join a new ad hoc network.

As should be appreciated from the foregoing, there are numerous aspects of the present invention described herein that can be used independently of one another, including the aspects that relate to facilitating regulatory compliance for ad hoc networks (e.g., using interaction between an operating system and a driver of a wireless communication device), prompting a verification of a country code to use prior to joining and/or creating an ad hoc network, allowing for the disablement of prompting, using locale information to select a country code to use when creating or joining an ad hoc network, using a common channel and power level when facilitating regulatory compliance for multiple regulatory domains, and selecting (or modifying) a country code for an ad hoc network based on detected country codes or channels used by other networks.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. At least one computer readable memory device encoded with a plurality of instructions for operating a computer system having a wireless communication device and a driver for the wireless communication device, wherein the plurality of instructions, when executed, perform a method comprising acts of:
   (A) interacting with the driver to facilitate compliance with wireless communication regulations for a regulatory domain when joining or creating an ad hoc network, wherein the act (A) comprises obtaining, from the driver, a list of regulatory domains supported by the driver;
   (B) presenting to a user the list of regulatory domains supported by the driver;
   (C) receiving a selection of a regulatory domain, wherein the regulatory domain is selected by the user from the list of regulatory domains supported by the driver;
   (D) when the wireless communication device is joining an ad hoc network, determining if the ad hoc network to be joined is broadcasting on the regulatory domain selected by the user;
   (E) if the ad hoc network to be joined is broadcasting on the regulatory domain selected by the user, the wireless communication device joining the ad hoc network;
   (F) if the ad hoc network to be joined is not broadcasting on the regulatory domain selected by the user, reporting to the user; and
   (G) the wireless communication device creating an ad hoc network by broadcasting on the regulatory domain selected by the user without determining if an ad hoc network is broadcasting on the regulatory domain selected by the user.

2. The at least one computer readable memory device of claim 1, wherein the wireless communication regulations for the regulatory domain comprise a specification of allowed channels for wireless signals emitted by the wireless communication device.

3. The at least one computer readable memory device of claim 1, wherein the wireless communication regulations for the regulatory domain comprise a specification of allowed power levels for wireless signals emitted by the wireless communication device.

4. The at least one computer readable memory device of claim 1, wherein the act (A) is performed by an operating system of the computer system.

5. The at least one computer readable memory device of claim 1, wherein the act (A) further comprises, when joining the ad hoc network, obtaining, from the driver, an indication of whether the ad hoc network to be joined broadcasts on a communication channel allowed by the regulatory domain.

6. The at least one computer readable memory device of claim 4, further comprising an act of determining the regulatory domain using locale information stored by the operating system of the computer system.

7. The at least one computer readable memory device of claim 1, wherein act (D) comprises determining whether a country code broadcast by the ad hoc network to be joined matches the country code of the regulatory domain selected by the user.

8. The at least one computer readable memory device of claim 1, wherein act (D) comprises determining whether the ad hoc network to be joined is broadcasting on a channel that is allowed by the regulatory domain selected by the user.

9. A method for operating a computer system including a wireless communication device and a driver for the wireless communication device, comprising:
  interacting with a driver to facilitate compliance with wireless communication regulations for a regulatory domain when joining or creating an ad hoc network, including obtaining, from the driver, a list of regulatory domains supported by the driver;
  presenting to a user the list of regulatory domains supported by the driver;
  receiving a selection of a regulatory domain, wherein the regulatory domain is selected by the user from the list of regulatory domains supported by the driver;
  when the wireless communication device is joining an ad hoc network, determining if the ad hoc network to be joined is broadcasting on the regulatory domain selected by the user;
  if the ad hoc network being joined is broadcasting on the regulatory domain selected by the user, the wireless communication device joining the ad hoc network;
  if the ad hoc network to be joined is not broadcasting on the regulatory domain selected by the user, reporting to the user; and
  the wireless communication device creating an ad hoc network by broadcasting on the regulatory domain selected by the user without determining if an ad hoc network is broadcasting on the regulatory domain selected by the user.

10. The method as defined in claim 9, wherein determining comprises determining whether a country code broadcast by the ad hoc network to be joined matches the country code of the regulatory domain selected by the user.

11. The method as defined in claim 9, wherein determining comprises determining whether the ad hoc network to be joined is broadcasting on a channel that is allowed by the regulatory domain selected by the user.

12. A method for operating a computer system including a wireless communication device and a driver for the wireless communication device, comprising:
  interacting with a driver to facilitate compliance with wireless communication regulations for a regulatory domain when joining or creating an ad hoc network, including obtaining, from the driver, a list of regulatory domains supported by the driver;
  presenting to a user the list of regulatory domains supported by the driver;
  receiving a selection of a regulatory domain, wherein the regulatory domain is selected by the user from the list of regulatory domains supported by the driver; and
  the wireless communication device creating an ad hoc network by broadcasting on the regulatory domain selected by the user without determining if an ad hoc network is broadcasting on the regulatory domain selected by the user.

* * * * *